(12) United States Patent
Ogasawara et al.

(10) Patent No.: US 9,425,452 B2
(45) Date of Patent: Aug. 23, 2016

(54) RESIN PLATE AND BUSBAR MODULE

(71) Applicant: YAZAKI CORPORATION, Tokyo (JP)

(72) Inventors: Shigeyuki Ogasawara, Kakegawa (JP); Shinichi Yanagihara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/742,975

(22) Filed: Jun. 18, 2015

(65) Prior Publication Data

US 2015/0372281 A1 Dec. 24, 2015

(30) Foreign Application Priority Data

Jun. 20, 2014 (JP) ................................. 2014-126836

(51) Int. Cl.
*H01R 4/60* (2006.01)
*H01M 2/20* (2006.01)
*H01R 9/22* (2006.01)

(52) U.S. Cl.
CPC ............... *H01M 2/206* (2013.01); *H01R 9/226* (2013.01); *H01M 2220/20* (2013.01)

(58) Field of Classification Search
CPC ... H01M 2/206; H01M 2220/20; H01M 2/20; H01R 4/60; H01R 11/288; H01R 9/226; H01R 11/28
USPC .......................................... 439/212, 34, 500
See application file for complete search history.

(56) References Cited

U.S. PATENT DOCUMENTS

| 8,999,552 B2 * | 4/2015 | Ogasawara ............ H01R 9/226 429/121 |
| 2012/0164509 A1 | 6/2012 | Ogasawara et al. |
| 2013/0178091 A1 | 7/2013 | Ogasawara et al. |

FOREIGN PATENT DOCUMENTS

JP 2011-077031 A 4/2011

* cited by examiner

*Primary Examiner* — Javaid Nasri
(74) *Attorney, Agent, or Firm* — Sughrue Mion, PLLC

(57) ABSTRACT

A resin plate includes divided resin plates that are linked to each other at a prescribed intermediate position in a battery arrangement direction of the battery assembly. Each of the divided resin plates includes busbar housing units arranged in the battery arrangement direction, wire housing units arranged in the battery arrangement direction, and a wire housing passage disposed at a position that is distant from the other side of the busbar housing units, houses wires that are different from wires housed in the wire housing units, and extends in the battery arrangement direction with its length which is greater in length than each of the busbar housing units and each of the wire housing units. The wire housing passage is formed, at its ends, with respective link and variation absorbing portions.

2 Claims, 7 Drawing Sheets

RESIN PLATE AND BUSBAR MODULE

CROSS REFERENCE TO RELATED APPLICATIONS

This application is based on Japanese Patent Application (No. 2014-126836) filed on Jun. 20, 2014, the contents of which are incorporated herein by reference.

BACKGROUND OF THE INVENTION

1. Field of the Invention

The present invention relates to a resin plate having plural busbar housing units and plural wire housing units and also to a busbar module having the resin plate.

2. Description of the Related Art

Referring to FIG. 6, reference numeral 101 denotes a battery assembly (refer to JP-A-2011-77031, for example). The battery assembly 101 is an assembly (arrangement) of plural batteries 102 and is installed in hybrid vehicles, electric vehicles, etc. Each battery 102 has a pair of electrodes 103, that is, a positive electrode and a negative electrode. The battery assembly 101 is installed at a prescribed position in a vehicle to supply power to an electric motor.

In FIGS. 6 and 7, reference numeral 104 denotes a busbar module that is attached to the battery assembly 101 to connect the adjoining batteries 102 of the battery assembly 101 in series. The busbar module 104 includes a resin plate 105, plural busbars 106, plural terminals 107 (only one of which is shown as an example), wires 108 that are connected to the terminals 107, thermistors (temperature sensors; not shown), and wires (not shown) connected to the thermistors.

As shown in FIG. 7, the resin plate 105 which is an insulative resin mold has plural busbar housing units 109, plural wire housing units 110, and plural covers 111. The busbar housing units 109 are arranged in the battery arrangement direction and thereby form a busbar housing unit assembly row unit 112. Each wire housing unit 110 is disposed in the vicinity of one side 113 of the associated busbar housing unit 109. The wire housing units 110 are also arranged in the battery arrangement direction and thereby form a wire housing unit assembly row unit 114.

Reference numeral 115 denotes wire lead-out portions. Each wire lead-out portion 115 is formed so as to connect the associated busbar housing unit 109 and wire housing unit 110, in the direction perpendicular to the battery arrangement direction.

Each cover 111 is connected to one side 116 of the associated wire housing unit 110. Each cover 111 is formed as a member for covering the opening of the associated wire housing unit 110. The covers 111 are arranged in the battery arrangement direction and thereby form a cover assembly row unit 117.

The busbar housing units 109 of the busbar housing unit assembly row unit 112 are linked to each other by a U-shaped hinge 118, for example. The wire housing units 110 of the wire housing unit assembly row unit 114 are likewise linked to each other by a U-shaped hinge 119, for example. Furthermore, the covers 111 of the cover assembly row unit 117 are linked to each other by a U-shaped hinge 120, for example. The hinges 118-120 are formed as members for absorbing pitch variations of the batteries 102 (see FIG. 6), in other words, variations of dimensions in the battery arrangement direction.

The busbars 106 are formed by working a conductive metal plate. A pair of through-holes 121 are formed through each busbar 106 as portions through which electrodes 103 (see FIG. 6) are inserted. The busbars 106 are housed in and fixed to the respective busbar housing units 109 of the resin plate 105. Terminals 107, which serve to detect voltages, for example, are each laid on the associated busbar 106 so as to be registered with one through-hole 121. A wire 108 is connected to each terminal 107 and housed in the wire housing unit assembly row unit 114 (wire housing units 110) via a wire lead-out portion 115.

The thermistors (not shown) are attached at prescribed positions between the busbar housing units 109 and the wire housing units 110 (attaching portion are not shown). The wires (not shown) connected to the thermistors are housed in the wire housing unit assembly row unit 114. Various wires such as the wires 108 and the wires leading from the thermistors are housed in the wire housing unit assembly row unit 114 in the form of a bundle.

The following problems arise when it is intended to relocate part (e.g., the wires leading from the thermistors (not shown)) of the various wires now housed in the wire housing unit assembly row unit 114 to a wire housing unit 122 indicated by imaginary lines in FIG. 7 (the thermistor attachment positions should also be relocated to the side of the wire housing unit 122). Since the wire housing unit 122 indicated by the imaginary lines is distant from the other side 123 of the busbar housing units 109, the wire housing unit 122 located at such a distant position is rendered insufficient in strength. Furthermore, if it is attempted to employ, in the wire housing unit 122, to absorb variations of dimensions in the battery arrangement direction, link structures using a U-shaped hinges like the hinge 119, the above-mentioned insufficiency in strength becomes more serious. An additional problem is that the employment of such hinge structures complicate the molding die, resulting in a cost increase.

The present invention has been made in the above circumstances, and an object of the present invention is therefore to provide a resin plate that is not rendered insufficient in strength even if part of various wires are housed at a distant position and that can absorb variations of dimensions in the battery arrangement direction, as well as a busbar module including such a resin plate.

SUMMARY OF THE INVENTION (1) To attain the above object, the invention provides a resin plate including:

plural busbar housing units to which plural busbars are to be housed and fixed, each of the plural busbars connecting, in series, adjoining ones of plural batteries constituting a battery assembly;

plural wire housing units that are disposed in a vicinity of one side of the busbar housing units and that house wires leading from the busbar housing units;

divided resin plates that are linked to each other at a prescribed intermediate position in a battery arrangement direction of the battery assembly, wherein each of the divided resin plates including:

a busbar housing unit assembly row unit which is formed by arranging the busbar housing units in the battery arrangement direction;

a wire housing unit assembly row unit which is formed by arranging the wire housing units in the battery arrangement direction; and a wire housing passage disposed at a position that is distant from the other side of the busbar housing units, houses wires that are different from the wires housed in the wire housing units, and extends in the battery arrangement direction with its length which is greater in length than each of the busbar housing units and each of the wire housing units; and wherein the wire housing passage is formed, at its ends, with respective link and variation absorbing portions having both of a function of linking adjoining ones of the divided resin plates and a function of absorbing deviations in the battery arrangement direction.

(2) To attain the above object, the invention also provides a busbar module including:

the resin plate according to the above item (1);

busbars which are housed and fixed to the plural respective busbar housing units of the resin plate respectively; and various wires housed in the wire housing units and the wire housing passages of the resin plate.

The resin plate according to the invention recited in the item (1) is formed by linking the divided resin plates which are obtained by dividing the resin plate at the intermediate positions in the battery arrangement direction, and the busbar housing unit assembly row unit and the wire housing unit assembly row unit are arranged close to each other in each divided resin plate. In each divided resin plate, the wire housing passage having the link and variation absorbing portions is formed at the position that is distant from the busbar housing unit assembly row unit etc. The wire housing passage is formed as a portion for housing part of various wires. The wire housing passage is longer than each of the busbar housing units constituting the busbar housing unit assembly row unit and each of the wire housing units constituting the wire housing unit assembly row unit. The long wire housing passage enables increase in strength even if it is located at a position that is distant from the busbar housing units, the wire housing units, etc.

The wire housing passage is formed with link and variation absorbing portions at its ends and hence has the link function of linking adjoining divided resin plates. This makes it possible to form the resin plate by linking the divided resin plates to each other. The link and variation absorbing portions also have the variation absorbing function of absorbing variations in the battery arrangement direction and hence make it possible to eliminate influences of battery pitch variations even if the wire housing passage is long. More specifically, such variations can be absorbed at the end positions of the wire housing passage without the need for employing structures for linking the busbar housing units and the wire housing units separately by hinges (in other words, without the need for forming a large number of hinges).

As such, the resin plate according to the invention provides advantages that its strength is not rendered insufficient even if part of various wires are housed at a distant position and variations of dimensions in the battery arrangement direction can be absorbed.

Including the resin plate recited in the above item (1), the busbar module according to the invention recited in the above item (2) provides advantages that its strength is not rendered insufficient and variations of dimensions in the battery arrangement direction can be absorbed.

DETAILED DESCRIPTION OF THE EXEMPLARY EMBODIMENTS

A busbar module includes a resin plate, busbars that are housed in and fixed to plural respective busbar housing units of the resin plate, and various wires that are housed in wire housing units and wire housing passages of the resin plate.

The resin plate is formed by linking divided resin plates obtained by dividing the resin plate at prescribed intermediate positions in the battery arrangement direction. In each divided resin plate, a wire housing passage having link and variation absorbing portions are formed at a position that is distant from each busbar housing unit and each wire housing unit. The wire housing passage is longer than each busbar housing unit and each wire housing unit. The link and variation absorbing portions are formed as portions for linking the adjoining divided resin plates to each other as well as portions for absorbing variations in the battery arrangement direction, in other words, battery pitch variations.

Embodiment

Figure 1:
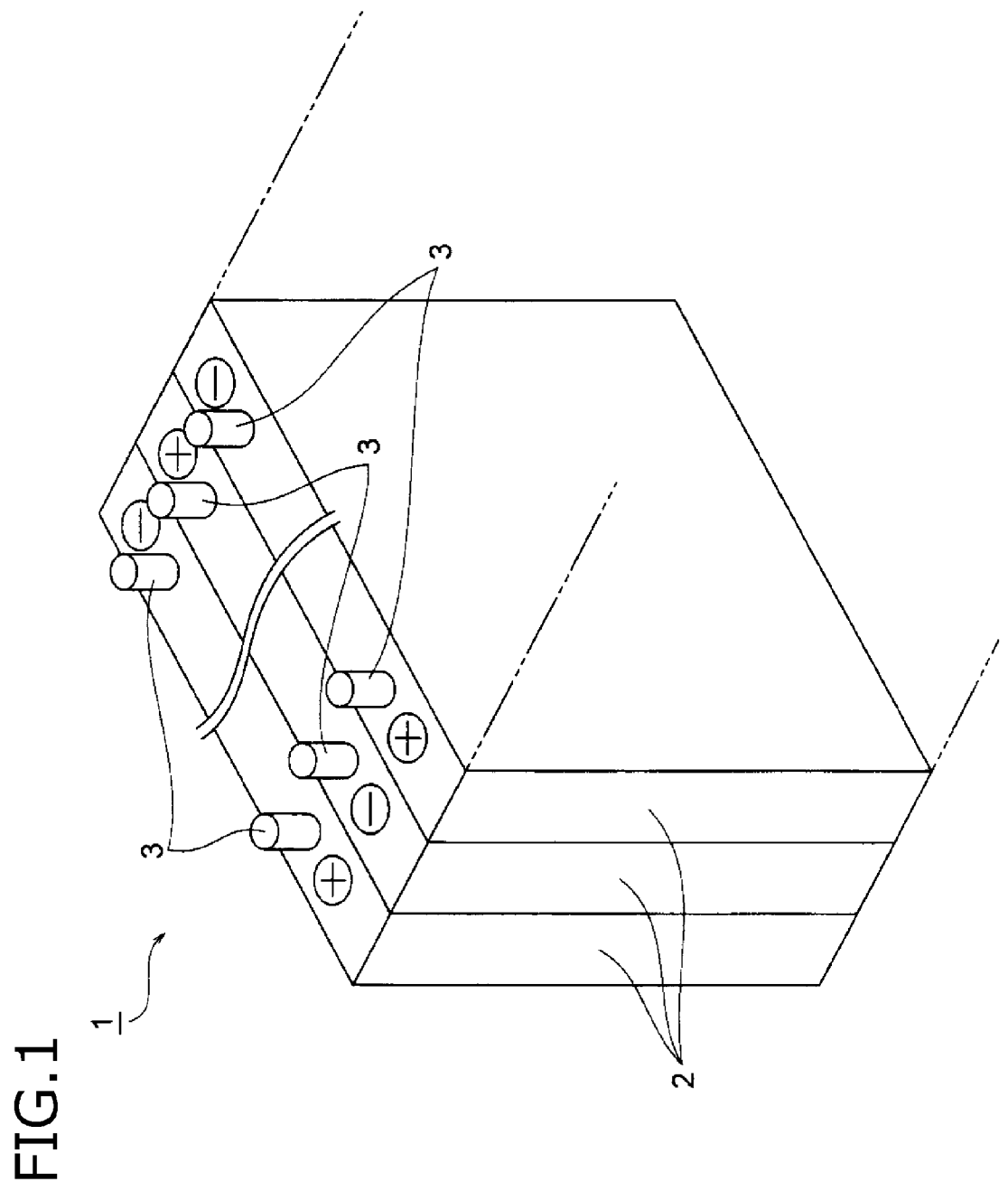
FIG. 1 is a schematic view of a battery assembly to which a busbar module according to an embodiment of the present invention is to be attached.

An embodiment of the present invention will be hereinafter described with reference to the drawings. FIG. 1 is a schematic view of a battery assembly 1 to which a busbar module 4 according to the embodiment is to be attached.

As shown in FIG. 1, the battery assembly 1 is an assembly (arrangement) of plural batteries 2 and is installed in hybrid vehicles, electric vehicles, etc. Each battery 2 has a pair of electrodes 3, that is, a positive electrode and a negative electrode. The battery assembly 1 is installed at a prescribed position in a vehicle to supply power to an electric motor.

Figure 2:
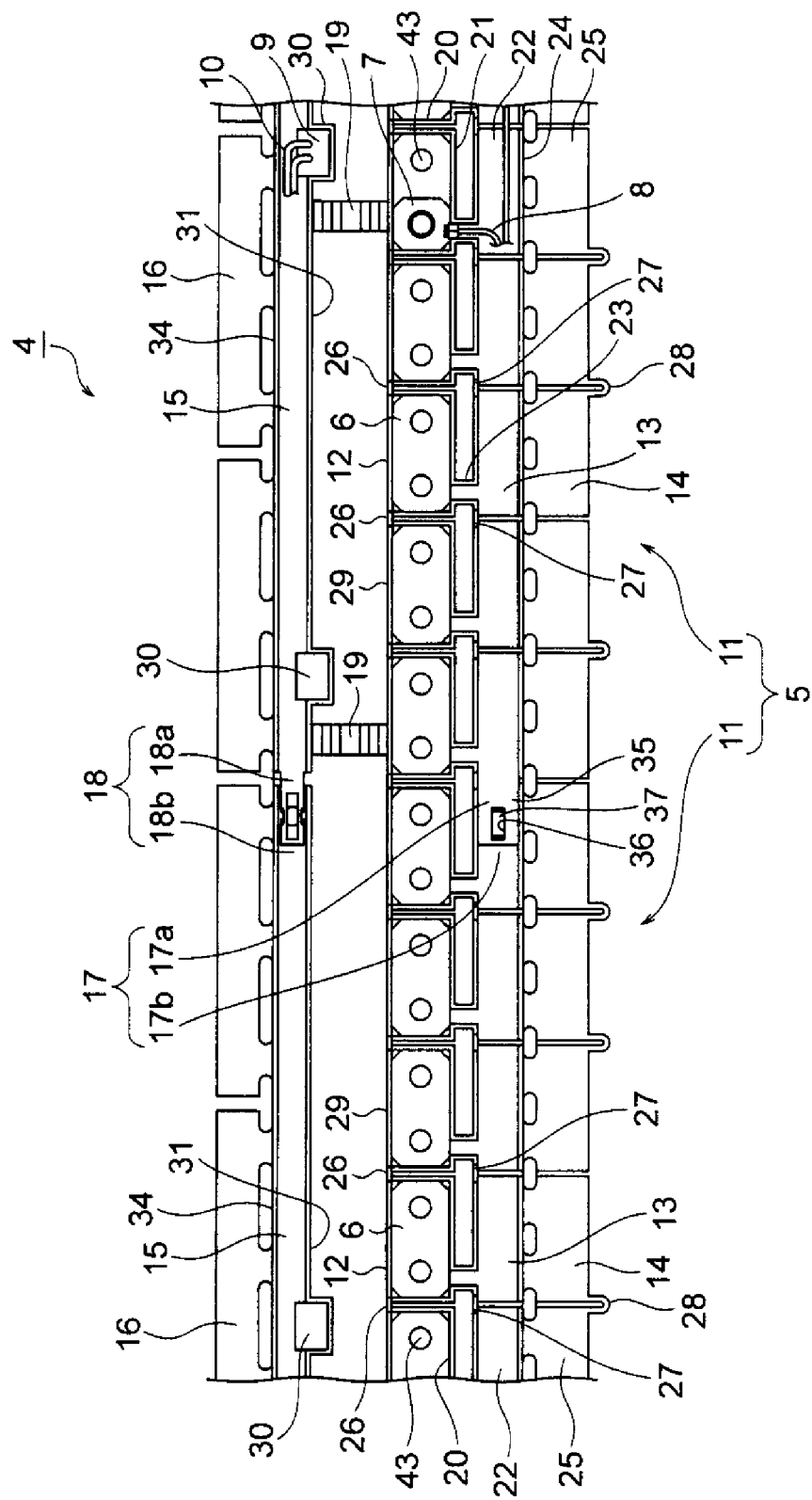
FIG. 2 is a plan view of the busbar module according to the embodiment and a resin plate included therein.
Figure 3:
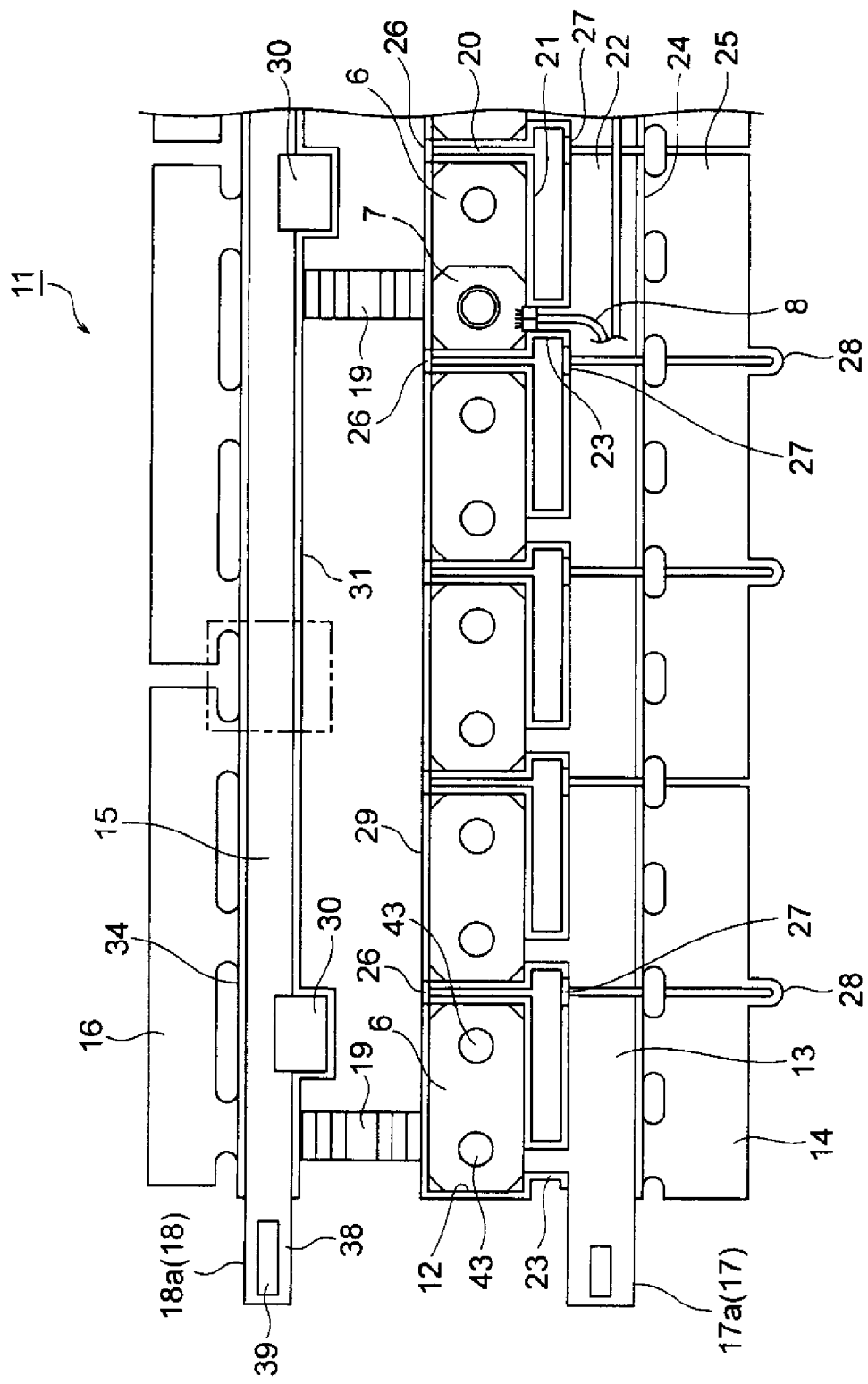
FIG. 3 is an enlarged view of one divided resin plate of the busbar module shown in FIG. 2.
Figure 4:
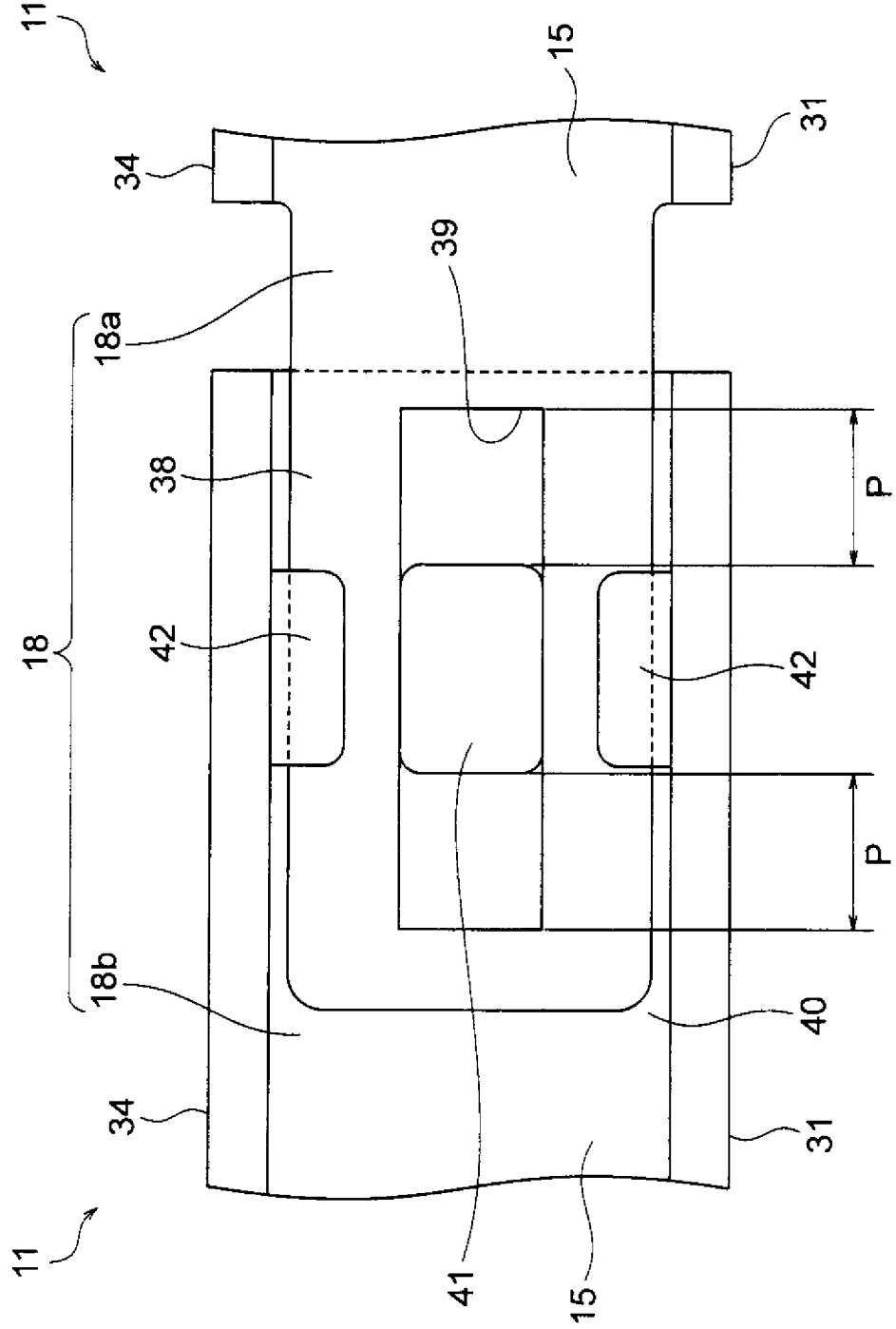
FIG. 4 is an enlarged view of a link and variation absorbing portion of the resin plate shown in FIG. 2.
Figure 5:
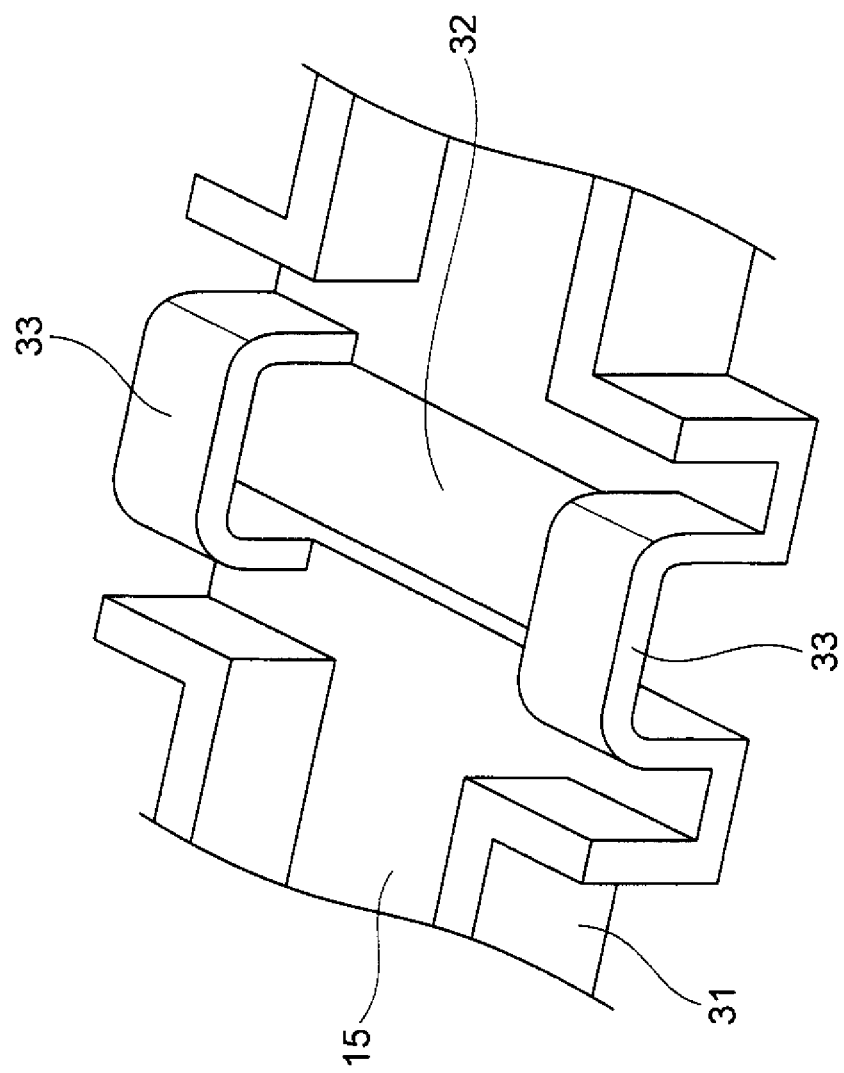
FIG. 5 is an enlarged perspective view of example hinges.
Figure 6:
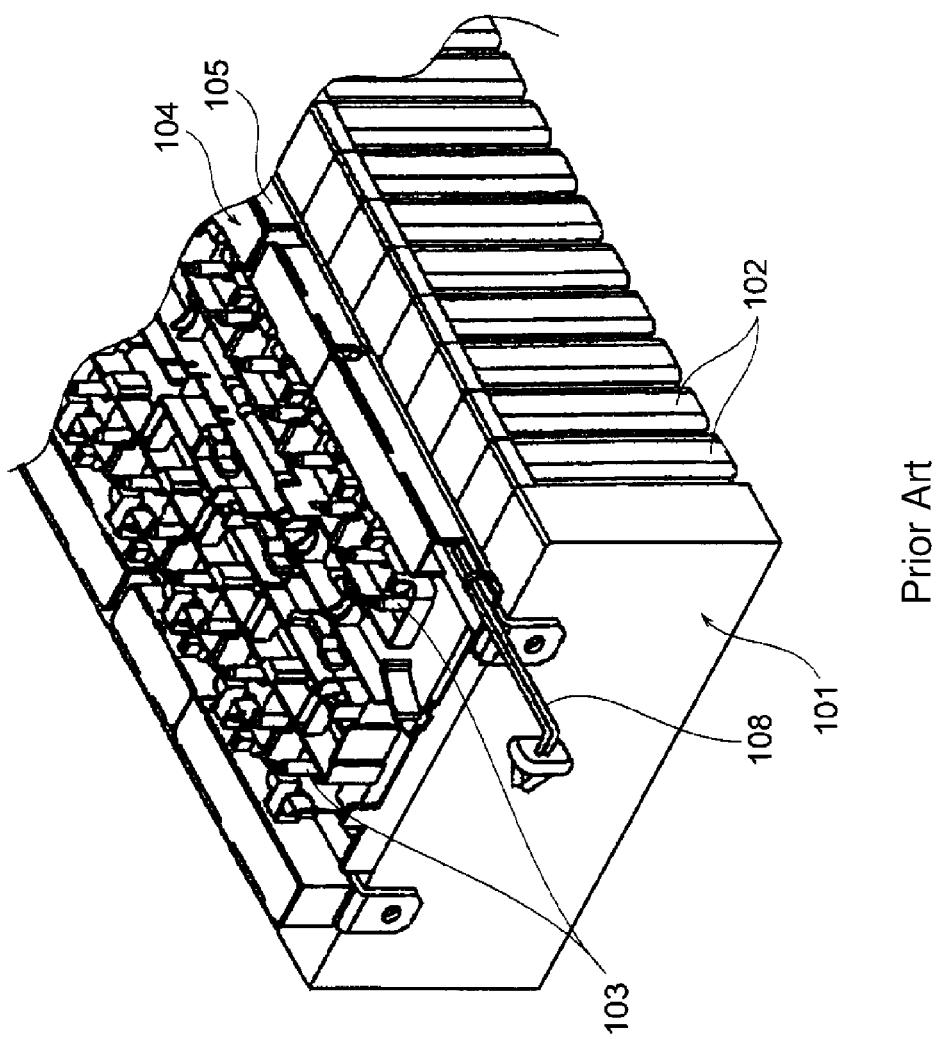
FIG. 6 is a perspective view of a conventional battery assembly and busbar module.
Figure 7:
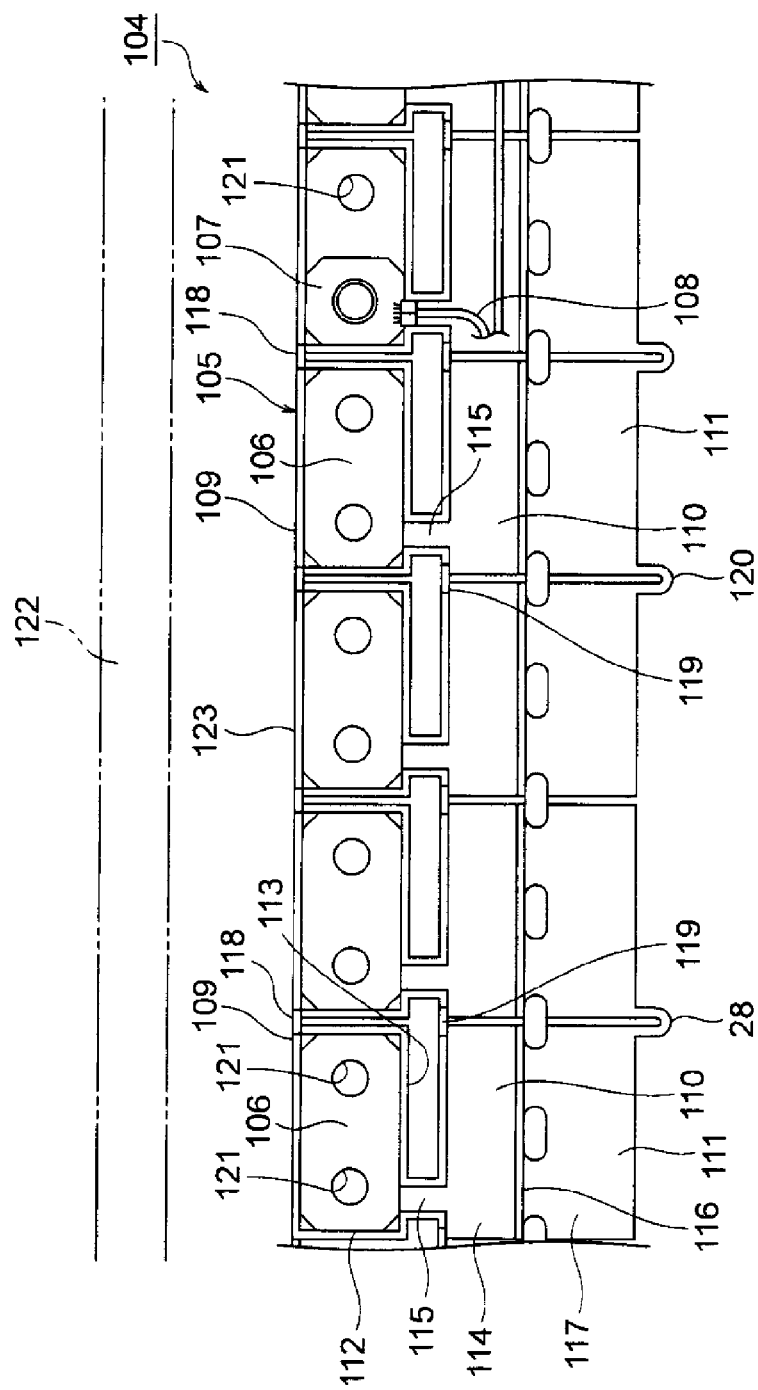
FIG. 7 is a plan view of the conventional busbar module shown in FIG. 6 and a resin plate included therein.

FIG. 2 is a plan view of the busbar module 4 according to the embodiment and a resin plate 5 included therein. FIG. 3 is an enlarged view of one divided resin plate of the busbar module shown in FIG. 2. FIG. 4 is an enlarged view of a link and variation absorbing portion of the resin plate 5 shown in FIG. 2. FIG. 5 is an enlarged perspective view of example hinges 33.

As shown in FIG. 2, to connect the adjoining batteries 2 of the battery assembly 1 (see FIG. 1) in series, the busbar module 4 is attached to the battery assembly 1 in the same manner as the conventional busbar module. The busbar module 4 includes a resin plate 5 according to the embodiment, plural busbars 6, plural terminals 7 (only one of which is shown), wires 8 that are connected to the terminals 7, thermistors 9 (temperature sensors; only one of which is shown), and wires 10 (lead wires) leading from the thermistors 9.

As shown in FIGS. 2 and 3, the resin plate 5 which is an insulative resin mold is formed by linking divided resin plates 11. The divided resin plates 11 are obtained by dividing the resin plate 5 at prescribed intermediate positions in the battery arrangement direction. In the embodiment, for the sake of convenience, it is assumed that the divided resin plates 11 have the same shape.

Each divided resin plate 11 has busbar housing units 12, wire housing units 13, and covers 14 which are the same as the corresponding ones provided in the conventional example. Each divided resin plate 11 also has, as new components, one or plural wire housing passages 15, one or plural passage covers 16, link portions 17 (17a and 17b), link and variation absorbing portions 18 (18a and 18b), and plural bridge portions 19.

The busbar housing units 12 are arranged in the battery arrangement direction and thereby form a busbar housing unit assembly row unit 20. Each wire housing unit 13 is disposed in the vicinity of one side 21 of the associated busbar housing unit 11. The wire housing units 13 are also arranged in the battery arrangement direction and thereby form a wire housing unit assembly row unit 22.

Each wire lead-out portion 23 is formed so as to connect the associated busbar housing unit 12 and wire housing unit 13, in the direction perpendicular to the battery arrangement direction.

Each cover 14 is connected to one side 24 of the associated wire housing unit 13. Each cover 14 is formed to serve as a member for covering the opening of the associated wire housing unit 13. The covers 14 are arranged in the battery arrangement direction and thereby form a cover assembly row unit 25.

The busbar housing units 12 of the busbar housing unit assembly row unit 20 are linked to each other by a U-shaped hinge 26. The wire housing units 13 of the wire housing unit assembly row unit 22 are likewise linked to each other by a U-shaped hinge 27. Furthermore, the covers 14 of the cover assembly row unit 25 are linked to each other by a U-shaped hinge 28. The hinges 26-28 are formed as members for absorbing pitch variations of the batteries 2 (see FIG. 1), in other words, variations of dimensions in the battery arrangement direction.

Each wire housing passage 15 is disposed at a position that is distant from the other side 29 of the busbar housing units 12. Each wire housing passage 15 is shaped approximately like a gutter so as to be able to house wires 10 leading from the thermistors 9, and extends a longer distance in the battery arrangement direction than each busbar housing units 12 and each wire housing units 13. It goes without saying that each wire housing passage 15 is given necessary and sufficient strength though it is distant from the busbar housing units 12 because as mentioned above it is shaped approximately like a gutter (approximately bracket-shaped in cross section) and is long.

Thermistor attaching portions 30 (i.e., portions for attachment of a thermistor 9) are formed at prescribed positions of each wire housing passage 15 on its one side 31. Link and variation absorbing portions 18 (18a and 18b; described later) are formed at respective ends (which correspond to the ends of the associated divided resin plate 11) of each wire housing passage 15.

A dividing portion 32 as shown in FIG. 5 may be formed in each wire housing passage 15 at a position as indicated by an imaginary line in FIG. 3 in such a manner that linkage is made there by U-shaped hinges 33. Each wire housing passage 15 suffers no serious reduction in strength as long as the numbers of dividing portions 32 and the hinges 3 are small.

Returning to FIGS. 2 and 3, the passage covers 16 are connected to the wire housing passages 15 on the other side 34 of the wire housing passages 15. The passage covers 16 are formed as members for covering the openings of the wire housing passages 15. Unlike the above-mentioned covers 14, the passage covers 16 are formed in portions that are not connected by U-shaped hinges 28.

The link portions 17 are formed as portions for connecting the adjoining divided resin plate 11. More specifically, each link portion 17 consists of a link portion 17a that is formed in the end wire housing unit 13 of one divided resin plate 11 and a link portion 17b that is formed in the end wire housing unit 13 of the other divided resin plate 11.

Each link portion 17a has a rectangular extension plate portion 35 which projects from the one wire housing unit 13 and a fitting concave portion 36 which is produced by forming a rectangular opening in the extension plate portion 35 at its center. The link portion 17b which belongs to the other wire housing unit 13 has a receiving portion (given no reference symbol) for receiving the extension plate portion 35 and a fitting convex portion 37 which projects from the receiving portion and is fitted into the fitting concave portion 36. The fitting convex portion 37 is a relatively large projection (larger than a slide projection portion 41 (described later)) that conforms to the opening shape of the fitting concave portion 36. The structure of each link portions 17 is not limited to the above one as long as it can link adjoining divided resin plates 11 to each other.

As shown in FIGS. 2-4, the link and variation absorbing portions 18 are formed as portions for linking adjoining divided resin plates 11 as well as portions for absorbing variations in the battery arrangement direction (in other words, battery pitch variations). That is, the link and variation absorbing portions 18 are formed as portions having both of a link function of linking of the adjoining divided resin plates 11 and a variation absorbing function of absorbing variations in the battery arrangement direction. Each of those link and variation absorbing portions 18 consists of a link and variation absorbing portion 18a formed in the wire housing passage 15 of one divided resin plate 11 and a link and variation absorbing portion 18b formed in the wire housing passage 15 of the other divided resin plate 11.

The link and variation absorbing portion 18a has a rectangular extension plate portion 38 which projects from one wire housing passage 15 and a slide concave portion 39 which is produced by forming a rectangular through-hole through the extension plate portion 38 at its center. The link and variation absorbing portion 18b which belongs to the other wire housing passage 15 has a slide receiving portion 40 for receiving the extension plate portion 38 in a slidable manner, a slide convex portion 41 which projects from the slide receiving portion 40 and is fitted into the slide concave portion 39 in a slidable manner, and a pair of slide support portions 42 which project from the inner surfaces of the side walls of the wire housing passage 15 and support the extension plate portion 38 in a slidable manner.

The slide concave portion 39 is shaped so as to produce a dimension P that gives the slide convex portion 41 movable regions that are at least as long as the battery pitch allowance. The pair of slide support portions 42 are disposed at such a position as to be suitable for the position of the slide convex portion 41.

It goes without saying that the formation of the link and variation absorbing portions 18 (18a and 18b) makes it unnecessary to form a large number of U-shaped hinges in the wire housing passages 15.

As shown in FIGS. 2 and 3, the bridge portion 19 are formed as portions for linking the side 29 of the busbar housing units 12 and the side 31 of the wire housing passage 15 and are shaped approximately like a bridge (approximately gate-shaped).

The above-described resin plate 5 will be summarized below. The resin plate 5 is formed by linking the divided resin plates 11 obtained by dividing the resin plate 5 at the intermediate positions in the battery arrangement direction. In each divided resin plate 11, the busbar housing unit assembly row unit 20 and the wire housing unit assembly row unit 22 are arranged close to each other. In each divided resin plate 11, the wire housing passage 15 having the link and variation absorbing portions 18 is formed at the position that is distant from the busbar housing unit assembly row unit 20 etc. The wire housing passage 15 is formed as a portion for housing part (wires 10) of various wires (8 and 10). The wire housing passage 15 is longer than each of the busbar housing units 12 constituting the busbar housing unit assembly row unit 20 and each of the wire housing units 13 constituting the wire housing unit assembly row unit 22. The long wire housing passage 15 enables increase in strength even if it is located at a position that is distant from the busbar housing units 12, the wire housing units 13, etc.

The wire housing passage 15 is formed with link and variation absorbing portions 18 at its ends and hence has the link function of linking adjoining divided resin plates 11. This makes it possible to form the resin plate 5 by linking the divided resin plates 11 to each other. The link and variation absorbing portions 18 also have the variation absorbing function of absorbing variations in the battery arrangement direction and hence make it possible to eliminate influences of battery pitch variations even if the wire housing passage 15 is long. More specifically, such variations can be absorbed at the end positions of the wire housing passage 15 without the need for employing structures for linking the busbar housing units 12 and the wire housing units 13 separately by hinges (in other words, without the need for forming a large number of hinges).

Referring to FIGS. 2 and 3, the busbars 6 are formed by working a conductive metal plate. A pair of through-holes 43 are formed through each busbar 6 as portions through which electrodes 3 (see FIG. 1) are inserted. The busbars 6 are housed in and fixed to the respective busbar housing units 12 of the resin plate 5.

Terminals 7, which serve to detect voltages, for example, are each laid on the associated busbar 6 so as to be registered with one through-hole 43. A wire 8 is connected to each terminal 7 and housed in the wire housing unit assembly row unit 22 (wire housing units 13) via a wire lead-out portion 23.

The thermistors 9 are attached to the thermistor attaching portions 30 of the wire housing passages 15. The wires 10 connected to the thermistors 9 are housed in the wire housing passages 15.

As described above with reference to FIGS. 1-5, the resin plate 5 according to the invention provides advantages that its strength is not rendered insufficient even if part of various wires are housed at a distant position and variations of dimensions in the battery arrangement direction can be absorbed.

Composed so as to include the resin plate 5, the busbar module 4 according to the invention provides advantages that its strength is not rendered insufficient and variations of dimensions in the battery arrangement direction can be absorbed.

It goes without saying that various modifications are possible without departing from the spirit and scope of the invention.

What is claimed is:

1. A resin plate comprising:
   plural busbar housing units to which plural busbars are to be housed and fixed, each of the plural busbars connecting, in series, adjoining ones of plural batteries constituting a battery assembly;
   plural wire housing units that are disposed in a vicinity of one side of the busbar housing units and that house wires leading from the busbar housing units;
   divided resin plates that are linked to each other at a prescribed intermediate position in a battery arrangement direction of the battery assembly,
   wherein each of the divided resin plates comprises:
      a busbar housing unit assembly row unit which is formed by arranging the busbar housing units in the battery arrangement direction;
      a wire housing unit assembly row unit which is formed by arranging the wire housing units in the battery arrangement direction; and
      a wire housing passage disposed at a position that is distant from the other side of the busbar housing units, houses wires that are different from the wires housed in the wire housing units, and extends in the battery arrangement direction with its length which is greater in length than each of the busbar housing units and each of the wire housing units; and
   wherein the wire housing passage is formed, at its ends, with respective link and variation absorbing portions having both of a function of linking adjoining ones of the divided resin plates and a function of absorbing deviations in the battery arrangement direction.

2. A busbar module comprising:
   the resin plate according to claim 1;
   busbars which are housed and fixed to the plural respective busbar housing units of the resin plate respectively; and
   various wires housed in the wire housing units and the wire housing passages of the resin plate.

* * * * *